United States Patent Office 3,417,349
Patented Dec. 17, 1968

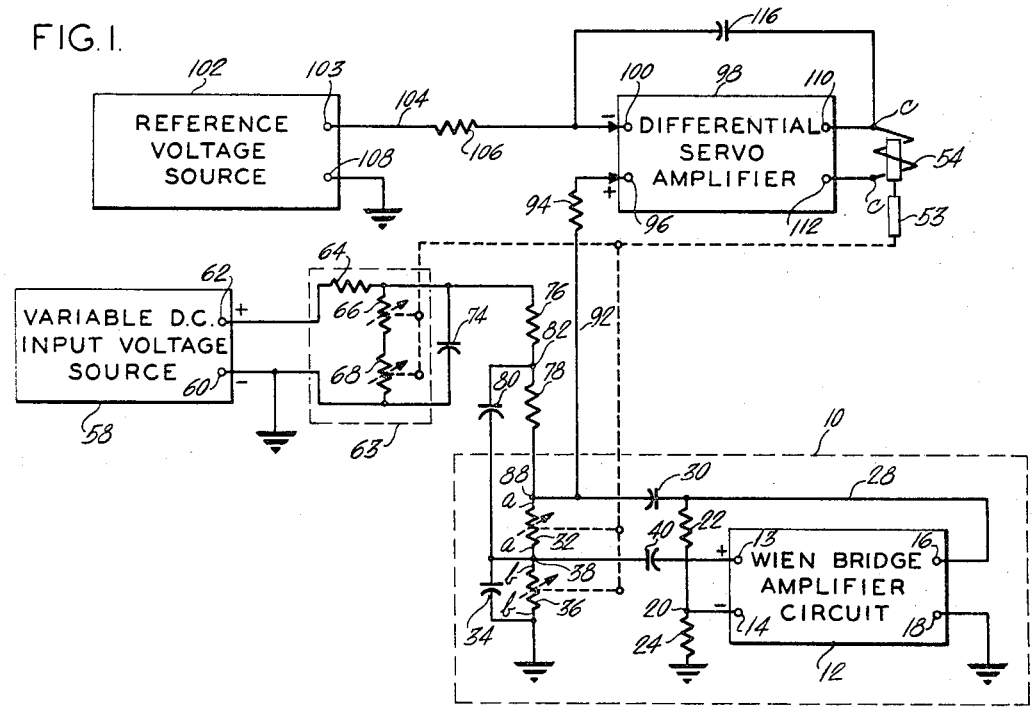

3,417,349
VOLTAGE-CONTROLLED WIEN BRIDGE OSCILLATOR WITH SERVO-CONTROLLED STRAIN-SENSITIVE RESISTANCES
Robert M. Schneider, Lake Success, N.Y., assignor to American Bosch Arma Corporation, Garden City, N.Y., a corporation of New York
Filed Oct. 5, 1967, Ser. No. 673,065
10 Claims. (Cl. 331—141)

ABSTRACT OF THE DISCLOSURE

A voltage-to-frequency converter in which a variable control voltage is caused to vary the frequency of a Wien bridge oscillator in direct substantially linear proportion to the control voltage. Strain-sensitive resistors on a deflectable beam are used as the frequency-controlling resistances of the Wien bridge, an additional resistance element is connected in series with the frequency-controlling resistors, and the control voltage is applied across this series combination. The beam is deflected by an electro-mechanical servo system in a manner such that the resultant changes in resistance of the strain-sensitive resistors cause the voltage across the strain-sensitive resistors to remain constant despite changes in the control voltage.

Background of invention

This invention relates to voltage-control of the frequency of oscillators, and especially to apparatus for producing electrical oscillations at a frequency which varies, preferably linearly, in direct proportion to a control voltage.

There are many applications in which it is desirable to provide an electrical signal having a frequency which varies in direct proportion to a control voltage. Such applications commonly arise in automatic control systems and in computers, where variations in a direct analog voltage having a magnitude representative of a control quantity are to be converted to a signal of proportional frequency. For example, in an inertial guidance or navigation system an analog-type accelerometer may produce a direct-voltage output proportional to acceleration which is to be converted to an oscillation having a frequency proportional to the acceleration; such an arrangement is particularly convenient in that a mere electrical counting of the cycles of oscillation then accomplishes electrical integration to provide indications of velocity, as is desired in many cases. Other applications for such apparatus also exist in many other and diverse fields.

In many such applications, including the above-mentioned inertial guidance application, it is desirable that the apparatus produce an output frequency which is relatively insensitive to temperature changes and aging, non-responsive to the effects of accelerations acting on the voltage-to-frequency conversion apparatus itself and simple and reliable.

Accordingly it is an object of the invention to provide new and useful apparatus for producing electrical oscillations having a frequency which varies directly with variations in a control voltage.

Another object is to provide such apparatus in which said frequency is variable in substantially linear direct proportion to said voltage.

Another object is to provide such apparatus which is stable yet simple.

Summary of the invention

In accordance with the invention the foregoing objects are achieved by the provision of apparatus comprising an oscillator circuit having an oscillation frequency varying in inverse proportion to the value of control resistance means therein, and means for applying a variable voltage across the series combination of said control resistance means and an additional resistance means; means are also provided for automatically varying said control resistance means in such manner as to maintain substantially constant the voltage thereacross despite variations in said applied voltage, whereby the resultant variations in said control resistance means are of a nature to cause said frequency to vary substantially in direct proportion to said applied voltage.

In a preferred and particularly advantageous form of the invention the oscillator circuit is an R-C oscillator of the Wien bridge type, the control resistance means comprise the series and parallel frequency-controlling resistance of the Wien bridge oscillator, and the latter two resistances are provided by a pair of substantially identically-constituted and similarly-disposed strain-sensitive resistors secured to a deflectable beam, the beam being deflected by a servo system in response to the voltage across the two control resistances to the extent necessary to maintain the latter voltage substantially constant. Preferably also, but not necessarily, a non-linearity compensation circuit may be used to predistort the control voltage variations so as to compensate for residual linearity errors in the apparatus, said compensation circuit comprising a voltage divider the output section of which comprises additional strain-sensitive resistance means secured to the opposite surface of said beam.

Brief description of figures

These and other objects and features of the invention will be more fully understood from a consideration of the following detailed description of the invention, taken together with the accompanying drawings, in which:

FIGURE 1 is a schematic diagram, partly in block form, of a preferred embodiment of the inventioin;

FIGURES 2 is a side elevational view, partly diagrammatic, of one preferred form of electro-mechanical apparatus utilizable in the servo-system portion of the system of FIGURE 1; and FIGURE 3 is a plan view, partly diagrammatic, of the apparatus of FIGURE 2.

Detailed description of preferred embodiment

Referring now by way of example only to the embodiment of the invention represented in the figures, there is employed a Wien bridge oscillator circuit 10 which may be of conventional form except in the respects noted hereinafter. As is usual, the oscillator comprises a Wien bridge amplifier circuit 12 which responds to the difference in alternating voltage supplied to its input terminals 13 and 14 to produce an amplified version thereof at its output terminals 16 and 18. Amplifier circuit 12 may comprise vacuum tubes or transistors with appropriate degenerative ballast-type arrangements arranged in conventional manner known to those familiar with Wien bridge oscillator circuitry. Output terminal 18 is connected to a source of reference potential designated ground, for both direct and alternating voltages; amplifier input terminal 14 is connected to ground for direct current but is provided with some negative A.C. feedback through connection to the tap point 20 on the voltage divider consisting of the resistors 22 and 24 connected in series between amplifier output line 28 and ground. Positive-feedback line 28 is connected to ground by way of the series combination of capacitor 30 and variable resistor 32 in series with the parallel combination of capacitor 34 and resistor 36. The junction point 38 between resistors 32 and 36 is connected by way of D.C.-blocking capacitor 40 to input terminal 13 of the amplifier circuit 12.

The Wien bridge circuit shown and described constitutes an example of an R-C oscillator circuit in which the oscillator frequency is inversely related to certain resistance values in the circuit; in the present example the frequency-controlling resistance values are the value $R_{32}$ of series resistor 32 as modified by any external loading resistor connected effectively in shunt therewith, and the value $R_{36}$ of resistor 36 as modified by any significant loading resistance in shunt therewith. The oscillation frequency is also determined in this example by the values of the capacitor 30 and the capacitor 34. However, in the present embodiment the latter two capacitors have fixed values, so that, in accordance with known theory of such oscillator circuits, the frequency of oscillation is proportional to $$\frac{1}{\sqrt{R_S R_P}}$$

where $R_S$ is the A.C. resistance of resistor 32 as modified by any resistance effectively connected in shunt therewith and $R_P$ is the A.C. resistance of resistor 36 as modified by any resistance effectively in shunt therewith. In the preferred embodiment the resistances $R_S$ and $R_P$ are maintained equal to each other at all times, and the oscillation frequency is therefore inversely proportional to an A.C. resistance value $R_C$ equal to both $R_S$ and $R_P$. Where the shunt resistive loading of the resistors 32 and 36 is negligible, the control resistance value $R_C$ is substantially equal to the value of either of the resistors 32 or 36.

The resistors 32 and 36 are strain-sensitive resistors which, as shown in FIGURES 2 and 3, are disposed adjacent and parallel to each other on the upper surface in the same position along the length of a cantilevered beam 50. Leads a—a from the opposite ends of resistor 32 and leads b—b from the opposite ends of resistor 36 connect the resistors as shown in the circuit of FIGURE 1. Beam 50 is secured at one end to the fixed support 52. The beam and strain-sensitive resistors constitute a known form of strain-gauge assembly. Although other types of strain-gauge assemblies may be utilized, it is preferred in this embodiment of the invention to employ a silicon solid-state semiconductor strain-gauge assembly of a known type in which the strain resistor elements 32 and 36 comprise epitaxially-deposited regions of conductivity-type differing from that of the remainder of the body of beam 50.

A controlled strain is applied to the beam, and hence to the strain resistors 32 and 36, by a connecting rod 53 bearing against or attached to the undersurface of the beam near its free end and driven by an electro-mechanical transducer comprising a coil 54 mounted in the magnetic gap between a north pole 56 and a south pole 58 of a magnet. In simple forms of the invention the electro-mechanical actuator may utilize the voice coil of a small loudspeaker as the coil 54, although one may employ more sophisticated types of electro-mechanical transducers suitable for such purposes and well known in the art. Increases in the current passed through the coil 54 by way of its terminal leads c—c produce an increasing upward force on the tip of beam 50 and a corresponding decrease in the resistances of the strain resistors 32 and 36. Such a strain gauge system is highly sensitive and reliable and, since the resistor elements are formed by impurity diffusion into the single crystalline silicon beam, hysteresis effects encountered in cemented strain gauge resistors are avoided.

In the preferred embodiment the beam is triangular in shape, rather than rectangular, as viewed in FIGURE 3, with its base fixed to the support 52 and its pointed end subjected to the deflecting force of rod 53. This shape of beam has been found to provide more uniform distribution of stress along the length of the beam, whereby strain resistors 32 and 36 may be formed thereon with substantially identical electrical characteristics but without requiring great criticality in their positioning along the beam.

The arrangement for varyng the resistances of the strain-sensitive frequency-controlling resistors 32 and 36 includes a variable D.C. input voltage source 58, one output terminal 60 of which is grounded. Connected between the ungrounded output terminal 62 and the grounded terminal 60 of the source is a compensating circuit 63 comprising resistor 64 of fixed value in series with a pair of strain-sensitive compensating resistors 66 and 68. Compensating circuit 63 is not essential to operation, and its purpose and nature will be described in more detail hereinafter. For the present purposes it is sufficient to note that the strain-sensitive resistors 66 and 68 are formed on the cantilever beam 50 in the same manner and position as the strain-sensitive resistors 32 and 36, but directly opposite the latter resistors on the underside of the beam rather than on the top thereof.

The compensating circuit 63 comprises electrically a voltage divider circuit, the output leg of which comprises the series combination of strain-sensitive resistors 66 and 68. Across the latter output leg there is directly connected a bypass capacitor 74 which is a bypass for the frequencies of oscillation of the Wien bridge oscillator. In parallel with the latter capacitor 74 there are connected in series the fixed resistors 76 and 78 and the frequency-controlling strain-sensitive resistors 32 and 36. In the preferred embodiment a capacitor 80, which is a bypass at the Wien bridge oscillation frequencies, is connected directly between the junction point 82 between resistors 76 and 78 and the junction point 38 between the strain-sensitive resistors 32 and 36. In embodiments in which the capacitor 80 is not employed, the separate fixed resistors 76 and 78 may be combined in a single resistor element. Capacitor 74 may also be omitted, provided that the value of resistor 76 is then reduced by an amount equal to the impedance from the top of resistor 76 to ground provided by the input elements (primarily resistors 66 and 68).

Accordingly the variable input voltage from source 58 is applied, after predistortion in compensating circuit 63, across the four resistors 76, 78, 32 and 36, and the fraction of this voltage which appears at the junction point 88 between resistor 78 and resistor 32 therefore depends upon the instantaneous magnitude of the input voltage and the instantaneous values of resistors 32 and 36; the voltage at junction point 88 is maintained substantially constant by automatically decreasing the resistance of resistors 32 and 36 when the input voltage increases, and vice versa. This automatic action is provided by the apparatus now to be described.

The voltage at junction point 88 is supplied over line 92 and through limiting resistor 94 to one input terminal 96 of differential servo amplifier 98. The other input terminal 100 of the servo amplifier is supplied with a reference voltage from reference voltage source 102 by way of lead 104 and limiting resistor 106 from output terminal 103, the other output terminal 108 of source 102 being grounded. It will be understood that, instead of a differential amplifier, one may employ an ordinary amplifier preceded by an appropriate combining circuit for the reference voltage and the voltage from point 88.

Differential servo amplifier 98 is preferably of a well-known type which provides high amplification of the difference between the voltage applied to its two input terminals. The input voltage to the amplifier 98 is, in effect, the voltage applied to its (+) input terminal 96 minus the voltage applied to its (−) terminal 100. The amplified output voltage appearing at output terminals 110 and 112 of amplifier 98 is applied across the terminal leads c–c of the electromagnetic actuator coil 54, which responds to increasing voltages applied thereto to move connecting rod 53 in the direction to reduce the values of the strain-sensitive resistors 32 and 36 identically. The result is that any difference between the voltage at junction point 88 and the voltage from reference voltage source 102 will be amplified and applied to reduce the values of resistors 32 and 36 until the difference approaches zero. The arrangement therefore provides automatic servo control of resistors 32 and 36 to maintain the voltage across them constant, despite variations in the input voltage from source 58. The capacitor 116 connected between the output and the negative input of servo amplifier 98 serves as a high-frequency cutoff integrating capacitor for stabilizing the servo loop, in known fashion.

The operation of the system will be understood more fully from a consideration of the following analysis. With the value of capacitor 40 selected sufficiently large to have no effect on frequency, the angular frequency $\omega$ of oscillations produced by the Wien bridge oscillator is known to be given by the relation $$\omega = \frac{1}{\sqrt{R_S R_P C_S C_P}} \quad (1)$$

where $R_S$ = series frequency-controlling resistance (resistance of resistor 32 modified by any significant shunting resistance)
$R_P$ = parallel frequency-controlling resistance (resistance of resistor 36 modified by any significant shunting resistance)
$C_S$ = capacitance of series capacitor 30
$C_P$ = capacitance of parallel capacitor 34

In the present embodiment $C_S$ is preferably selected equal to $C_P$, and $R_S$ equal to $R_P$, so that:

$$\omega = 1/CR_c \quad (2)$$

where $R_c$ = the resistance of either $R_P$ or $R_S$
$C$ = the capacitance of either $C_S$ or $C_P$ Where the resistance $R_{76}$ and $R_{78}$ of fixed resistors 76 and 78, and of any other resistances effectively in shunt with strain-sensitive resistors 32 and 36, are large compared with the resistances $R_{32}$ and $R_{36}$ of the strain-sensitive resistance, $$\omega = 1/CR_{32} = 1/CR_{36} \quad (3)$$

and capacitors 74 and 80 can be eliminated without substantial adverse effect on the desired frequency linearity.

However, if $R_{76}$ and $R_{78}$ are small enough to exert a substantial loading effect with respect to the oscillator signals, bypass capacitors 74 and 80 are preferably employed and $R_{76}$ is selected equal to $R_{78}$. In this case, capacitor 80 connects $R_{78}$ in shunt with $R_{32}$ for oscillator signals, and capacitors 74 and 80 connect $R_{76}$ in shunt with $R_{36}$ for oscillator signals. The oscillation frequency is then given by $$\omega = 1/CR_c = \frac{1}{C} \frac{R_{32} + R_{78}}{R_{32} R_{78}} = \frac{1}{C} \frac{R_{36} + R_{76}}{R_{36} R_{76}} \quad (4)$$

Now designating as $V_T$ the total input voltage from compensator 63 applied across resistors 76, 78, 32 and 36 and the divided-down voltage at junction 88 as $V_{88}$, $$V_{88} = V_T \frac{R_S + R_P}{R_{76} + R_{78} + R_S + R_P} \quad (5)$$

whence $$R_S + R_P = \frac{V_{88}(R_{76} + R_{78})}{V_T - V_{88}} \quad (6)$$

In the preferred embodiment, $R_S = R_P = R_C$, and $R_{76}$ and $R_{78}$ each equal the same value $R_0$, Equation 6 then becomes $$R_C = \frac{V_{88} R_0}{V_T - V_{88}} \quad (7)$$

Substituting this in Equation 2 gives:

$$\omega = \frac{(V_T - V_{88})}{CV_{88} R_0} \quad (8)$$

Since the electro-mechanical servo system holds $V_{88}$ substantially constant, from Equation 8 it is seen that:

$$\omega = K_2 V_T - K_3 \quad (9)$$

where $K_2$ and $K_3$ are constants. Accordingly, with the values of $C_{30}$ and $C_{34}$ selected equal, with $R_{32} = R_{36}$ and $R_{76} = R_{78}$, and with $R_{76}$ and $R_{78}$ both large compared with $R_{32}$ and $R_{36}$, the desired linear direct proportionality between oscillator frequency and the control voltage $V_T$ is obtained as shown by Equation 9.

If the compensating circuit 63 is removed, $V_T$ is the same as the input control voltage $V_{in}$ from source 58 and hence the oscillator frequency is then theoretically proportional to $V_{in}$. However, in practice some deviation from linearity between $V_T$ and $\omega$ will sometimes be found, usually such that the frequency falls slightly below the theoretical value for perfect linearity as $V_T$ is increased. With compensating circuit 63 connected in the system, this frequency fall-off can be compensated for by appropriate selection of the values of resistors 64, 66 and 68. In this connection it is noted that as $V_{in}$ increases the strain-gauge resistances $R_{32}$ and $R_{36}$ decrease to maintain $V_{88}$ constant; accordingly the resistances of strain-sensitive resistors 66 and 68 increase with increasing $V_{in}$, since they are on the opposite side of beam 50 from resistors 32 and 36. This causes $V_T$ to increase faster than $V_{in}$ and hence compensates for and corrects any frequency fall-off of $\omega$ with increasing $V_{in}$.

The latter discussion has assumed that $R_S$ and $R_P$ are comprised substantially entirely of the resistances of strain-sensitive resistors 32 and 36. If, on the contrary, resistors 76 and 78 are sufficiently small to provide a substantial loading of the oscillators, then Equation 4 is applicable instead of Equation 2. Thus, substituting Equation 7 in Equation 4, and assuming again that $R_{76}$ and $R_{78}$ each equal the same fixed value $R_0$ and that $R_{32}$ and $R_{36}$ each equal $R_C$, $$\omega = \frac{V_T}{CR_0 V_{88}} \quad (10)$$

Again, since all factors of Equation 10 are constants except for $\omega$ and $V_T$, the desired linear relationship between $\omega$ and $V_T$ is obtained. As discussed previously, if compensating circuit 63 is not used, $\omega$ is theoretically exactly directly proportional to $V_{in}$; however, the compensating circuit enables correcting of any minor residual deviations from linearity.

It is noted that in both Equation 8 and Equation 10, which express the linearity of $\omega$ with $V_T$, there is no factor dependent on strain-gauge factor or on strain-resistance value. Accordingly, the frequency of the oscillater is insensitive to changes in gauge factor or strain-resistor values due to effects such as aging or temperature change. In addition, the oscillation frequency is insensitive to acceleration of the beam 50 or of beam support 52 which tend to produce deflection of the beam, since the servo system assures that one and only one beam deflection can exist for a given control input voltage $V_{in}$, within the limits of the range and rate of beam deflections which the servo system is able to produce.

It will be appreciated that the servo system operates to control the D.C. resistance of the strain-gauge resistors, while the oscillation frequency depends upon the A.C. values of the resistances. Equality between A.C. and D.C. resistance values is therefore desirable for best linearity, and is particularly easily obtainable over a wide range of frequencies when using strain-gauge resistors formed integrally on single crystalline semiconductor material.

In the preferred embodiment then, the oscillator is one having a frequency inversely proportional to the value of a control resistance means (e.g. $R_{32}$ and $R_{36}$); the control voltage is applied to the control resistance means in series with additional voltage-dropping resistance means (e.g. $R_{76}$, $R_{78}$) so that the voltage $V_{88}$ across the control resistance means can be held constant by variation of the control resistance; the voltage $V_{88}$ is automatically held constant through automatic variation of the control resistance by an electro-mechanical servo system; and the resultant variation of the control resistance is inverse to changes in control voltage so that the oscillation frequency varies in the same sense as, and substantially linearly with, the control voltage. In the case of the Wien bridge oscillator, the series and parallel control resistances are preferably equal, or at least vary equally in value in response to changes in control voltage; however, good linearity can also be obtained by varying the parallel and series control resistance $R_S$ and $R_P$ so that the changes in one control resistance are in a fixed proportion to changes in the other. For example, $R_{32}$ may be twice $R_{36}$, with $R_{32}$ and $R_{36}$ inherently changing by the same percentage for a given change in beam deflection; the absolute changes in $R_{36}$ and $R_{32}$ will then be in the fixed ratio 2:1, and the desired linearity still obtained.

Furthermore the series and parallel capacitors 30 and 34 need not be equal in value since, being constant, they do not affect the linearity of frequency with control voltage.

It will be understood that the input voltage source 58 may include means for adding a controllable fixed voltage to the varying input signal component; this is convenient when the varying component is negative or alternating in polarity, since adding a sufficient fixed voltage to the varying component then will produce a total voltage of a single polarity at all times, as desired for operation of the circuit.

Without thereby in any way limiting the scope of the invention, the following example of component values and operating parameters is provided:

| | |
|---|---|
| Material of beam 50 | Single-crystalline silicon. |
| Strain resistors 32, 36, 66, 68 | Identical epitaxially-deposited strain resistors, operating range 260 ohms to 340 ohms. |
| Dimensions of beam 50 | Length 0.75 inch, width at base 0.35 inch, thickness 0.005 inch. |
| Beam deflection | Tenths of an inch. |
| Deflection force on beam | Order of 10's of grams. |
| Electromagnetic transducer | Small radio loudspeaker. |
| Oscillator frequency | 9,000 c.p.s. ±1200. |
| Input control voltage | 45 to 55 volts. |
| Resistor 94 | 1 megohm. |
| Resistor 106 | 1 megohm. |
| Reistor 64 | 4,000 ohms. |
| Resistor 76 | 1,000 ohms. |
| Resistor 78 | 1,000 ohms. |
| Resistor 22 | 20,000 ohms. |
| Resistor 24 | 24,000 ohms. |
| Capacitor 116 | 0.05 microfarad. |
| Capacitor 74 | 30 microfarads. |
| Capacitor 80 | 30 microfarads. |
| Capacitor 34 | .007 microfarad. |
| Capacitor 30 | .007 microfarad. |
| Capacitor 40 | 30 microfarads. |

While the invention has been described with particular reference to one specific embodiment thereof in the interests of complete definiteness, it will be understood that it may be embodied in any of a variety of forms diverse from those specifically shown without departing from the spirit and scope of the invention as defined by the appended claims.

What is claimed is:

1. A voltage-controlled oscillator system, comprising:
   an oscillator circuit comprising frequency-controlling resistance means, variations in the resistance of which produce inversely-related variations in the frequency of oscillations in said circuit;
   additional resistance means in series with said frequency-controlling resistance means;
   a source of variable control voltage for supplying a control voltage across the series combination of said additional resistance means and said frequency-controlling resistance means; and
   automatic control means responsive to the difference between a reference voltage and the voltage produced across said frequency-controlling resistance means by said control voltage for varying the resistance of said frequency-controlling resistance means in the direction to maintain said difference near zero despite variations in said control voltage, whereby said oscillation frequency varies directly with said control voltage.

2. The system of claim 1, in which said oscillator circuit is of the Wien bridge type and said frequency-controlling resistance means comprise the series frequency-controlling resistance $R_S$ and the parallel frequency-controlling resistance $R_P$ of said Wien bridge oscillator.

3. The system of claim 1, in which said automatic control means comprises an electro-mechanical servo system for mechanically varying the resistance of said frequency-controlling resistance means.

4. The system of claim 3, in which said electro-mechanical servo system comprises an electro-mechanical transducer supplied with the voltage across said frequency-controlling resistance means and a supporting beam deflectable by said transducer, and in which said frequency-controlling resistance means are secured to said beam and are strain-sensitive so as to change resistance with deflection of said beam.

5. The system of claim 1, in which said frequency-controlling resistance means have a resistance which is strain-sensitive and said automatic control means comprise means for applying a variable strain to said frequency-controlling resistance means to change the resistance thereof.

6. A system for producing variations in oscillation frequency varying directly with variations in a control voltage, comprising:
   a Wien bridge oscillator comprising an amplifier circuit and a feedback circuit for said amplifier circuit, said feedback circuit comprising a parallel combination of first frequency-controlling resistance means and first reactive means, in series with a series combination of second frequency-controlling resistance means and second reactive means, the frequency of oscillation of said oscillator varying inversely with the values of said first and second resistance means;
   third resistance means connected in common series circuit with said first and second resistance means;
   means for applying across said common series circuit a control voltage variable at a rate low compared with said oscillation frequency;
   supporting-beam means, said first and second frequency-controlling resistance means comprising, respectively, first and second strain-sensitive resistors secured to the same side of said supporting-beam means so that their resistances vary in fixed proportion to each other in response to deflection of said beam; and
   electromagnetic means responsive to departures from a reference value of the voltage across said first and second frequency-controlling resistance means for deflecting said supporting-beam means to change the resistance of said strain-sensitive resistors in the sense to oppose said departures.

7. The system of claim 6, in which said supporting-beam means comprises a cantilever beam of monocrystalline silicon and said strain-sensitive resistors each comprise integral regions of said beam of conductivity-type differing from that of adjacent portions of said beam.

8. The system of claim 7, in which said strain-sensitive resistors are substantially identical to each other and are disposed beside each other at the same distance from the support for said beam.

9. The system of claim 6, in which said third resistance means comprises first and second fixed resistance elements connected in series by way of an intermediate junction point, said system comprising first capacitive means connected between said junction point and the interconnection of said first and second strain-sensitive resistors for bypassing signals of said oscillation frequency.

10. The system of claim 9, comprising second capacitive means connected across said common series circuit for bypassing signals of said oscillation frequency.

References Cited

UNITED STATES PATENTS 3,127,577  3/1964  Lapointe _____ 331—141 X

JOHN KOMINSKI, *Primary Examiner.*

SIEGFRIED H. GRIMM, *Assistant Examiner.*

U.S. Cl. X.R.

331—177; 332—29